US012735598B2

(12) United States Patent
Walawalkar

(10) Patent No.: US 12,735,598 B2
(45) Date of Patent: Sep. 15, 2026

(54) POLYMER COMPOSITION AND PROCESS FOR COATING WOODEN PALLET WITH THE POLYMER COMPOSITION

(71) Applicant: Verte Technologies, LLC, Salt Lake City, UT (US)

(72) Inventor: Deenar Shashikant Walawalkar, Mumbai (IN)

(73) Assignee: Verte Technologies, LLC, Salt Lake City, UT (US)

( * ) Notice: Subject to any disclaimer, the term of this patent is extended or adjusted under 35 U.S.C. 154(b) by 140 days.

(21) Appl. No.: 18/714,531

(22) PCT Filed: Oct. 28, 2022

(86) PCT No.: PCT/US2022/078834
§ 371 (c)(1),
(2) Date: May 29, 2024

(87) PCT Pub. No.: WO2023/077039
PCT Pub. Date: May 4, 2023

(65) Prior Publication Data

US 2024/0409765 A1 Dec. 12, 2024

(30) Foreign Application Priority Data

Oct. 29, 2021 (IN) ............................. 202123049643

(51) Int. Cl.
*C09D 15/00* (2006.01)
*B65D 19/38* (2006.01)
(Continued)

(52) U.S. Cl.
CPC ............ *C09D 15/00* (2013.01); *B65D 19/38* (2013.01); *C09D 5/021* (2013.01); *C09D 7/65* (2018.01);
(Continued)

(58) Field of Classification Search
CPC .. C09D 175/02; C09D 175/04; C09D 175/14; C09D 5/00; C09D 5/4465; C09D 5/4473; C08G 18/62; C08G 18/778; C08G 18/289; C08L 75/02; C08L 75/04; C08L 83/04; C08L 83/06; C08L 2205/03; B05D 2503/00; B05D 2518/10
See application file for complete search history.

(56) References Cited

U.S. PATENT DOCUMENTS

2011/0005435 A1* 1/2011 Renck ................ B65D 19/0095 108/57.17
2014/0348776 A1 11/2014 Palmer

FOREIGN PATENT DOCUMENTS

GB 2489701 A * 10/2012 ......... B65D 19/0097
GB 2504763 A * 2/2014 ............. G06Q 30/04
WO WO-2021090198 A1 * 5/2021 .............. C08L 25/06

* cited by examiner

*Primary Examiner* — William P Fletcher, III
(74) *Attorney, Agent, or Firm* — David B. Tingey; K. Russell Griggs; Kirton McConkie

(57) ABSTRACT

A polymer composition for coating a wooden pallet may include a mixture of at least one of polyurea, polyurethane, silicon elastomer, and combination thereof in a predefined ratio. A process for coating the polymer composition onto the wooden pallet includes heating a polymer composition, forming a coating on a surface of the wooden pallet using a matrix coating process, and drying the coating on the surface of the wooden pallet at room temperature.

22 Claims, 2 Drawing Sheets

(51) Int. Cl.
*C09D 5/02* (2006.01)
*C09D 7/65* (2018.01)
*C09D 175/02* (2006.01)

(52) U.S. Cl.
CPC .. *C09D 175/02* (2013.01); *B65D 2519/00029* (2013.01); *B65D 2519/00034* (2013.01); *B65D 2519/00044* (2013.01)

POLYMER COMPOSITION AND PROCESS FOR COATING WOODEN PALLET WITH THE POLYMER COMPOSITION

CROSS REFERENCE TO RELATED APPLICATIONS

This application claims priority from patent application filed in India having patent application No. 202123049643, filed on Oct. 29, 2021 and titled "A POLYMER COMPOSITION AND PROCESS FOR COATING WOODEN PALLET WITH THE POLYMER COMPOSITION".

FIELD OF INVENTION

Embodiments of a present disclosure relate to coating a wooden pallet and more particularly to a polymer composition and process for coating wooden pallet with the polymer composition.

BACKGROUND

A pallet is a flat transport structure, which supports goods in a stable fashion while being lifted by a forklift, a front loader, a pallet jack, an erect crane, or a jacking device. A pallet is the structural foundation of a unit load which allows handling and storage efficiencies. Wooden pallets typically consist of three or four stringers that support several deckboards, on top of which goods are placed.

Pallets are manufactured from a variety of materials. The wood pallet dominates the marketplace, providing an excellent value regarding price and performance. Wood is a stiff material, inexpensive, and easily fabricated into various sizes as required. Wood composite pallets also provide a stiff, competitively priced product which can be readily recycled, and which are typically nestable to improve cube utilization in transport and storage.

However, the wooden pallets are not waterproof, easy to damp and perishable. They need fumigation or heat treatment while one-time export packaging materials, so as to raise additional costs and extend the clearance time. To overcome these problems, sanding and painting techniques are used for protecting the wooden pallet from water vapors and termites.

Even though sanding helps avoid chemicals, exposing to wood dust can be harmful to human health. Anyhow, the sanding and painting techniques are less reliable, less durable and time consuming.

Recent studies have also depicted an aliphatic polymer coating on surface of the wooden pallet. Such aliphatic polymer coating includes coating of polyurea or polyurethane on the surface of the wooden pallet. However, use of the polyurea for the wooden pallet coating makes a product expensive and the polyurethane is very sensitive to humidity conditions.

Hence, there is need for an improved and cost-effective polymer composition and process for coating wooden pallet with the polymer composition for imparting sturdiness and flexibility.

SUMMARY

In accordance with an embodiment of the present invention, a polymer composition for coating wooden pallet is provided. The polymer composition includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The polymer composition imparts desired properties such as high impact and abrasion resistance, elongation strength, and anti-static property along with flexural strength to the wooden pallet.

In accordance with another embodiment of the present invention, a process for coating a polymer composition onto wooden pallet is provided. The process includes heating a mixture of at least one of polyurea, polyurethane, silicon elastomer, and combination thereof in a predefined ratio at 70° C. to 85° C. to obtain the polymer composition in a molten state. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The process also includes coating the wooden pallet with the molten polymer composition to form a layer of predefined thickness on surface of the wooden pallet. The coating of molten polymer composition being performed using matrix coating process. The process further includes drying the coating on the surface of the wooden pallet at a room temperature.

In accordance with yet another embodiment of the present invention, a wooden pallet is provided. The wooden pallet includes a layer of predefined thickness of a polymer composition coated on surface of the wooden pallet. The polymer composition includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The invention will be described and explained with additional specificity and detail with the accompanying figures in which.

Figure 1:
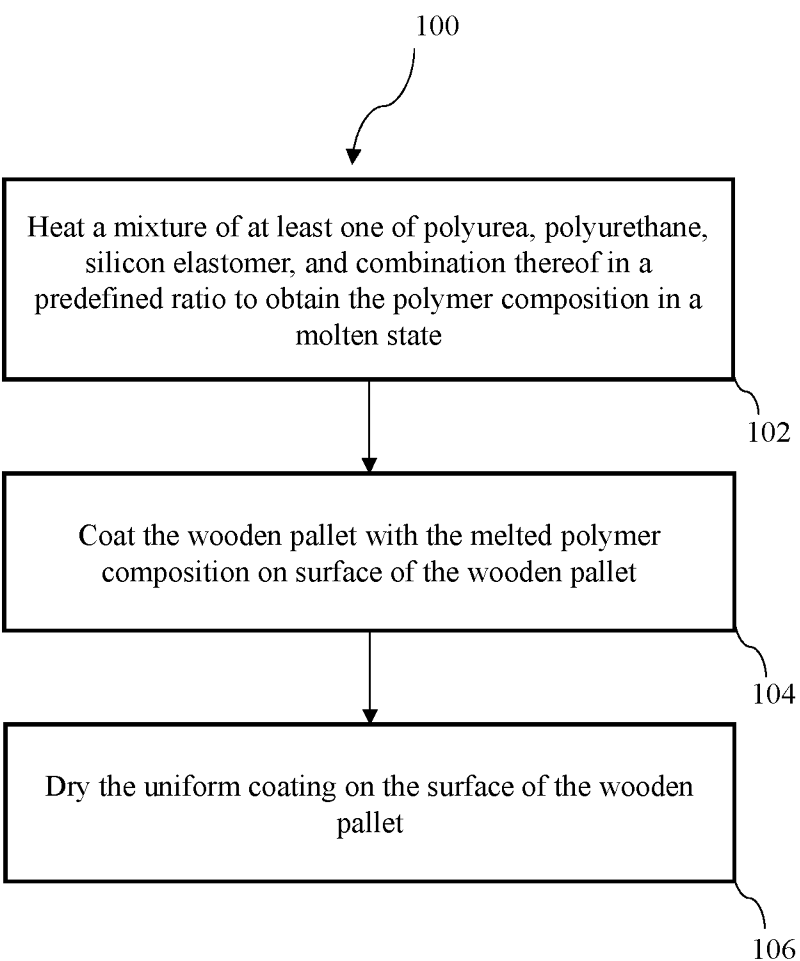
FIG. 1 is a flowchart representing steps involved in a process for coating a polymer composition onto wooden pallet, in accordance with an embodiment of the present invention.

Further, those skilled in the art will appreciate that elements in the figures are illustrated for simplicity and may not have necessarily been drawn to scale. Furthermore, in terms of the method steps, chemical compounds, and parameters used herein may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more components, compounds, and ingredients preceded by "comprises . . . a" does not, without more constraints, preclude the existence of other components or compounds or ingredients or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present invention relates to a polymer composition for coating wooden pallet. The invention mainly focuses on a hybrid polymer composition which imparts elongation strength, and flexural strength to the wooden pallet. The invention also provides a process for coating the wooden pallet. The process mainly involves matrix coating process for coating the wooden pallet. Further the invention also relates to a wooden pallet coated with a polymer composition.

As used herein the term 'matrix coating process' relates to a process of polishing cured coating to improve release and low friction.

The present invention provides for a wooden pallet with improved flexural strength and elongation strength. The wooden pallet is coated with a predefined number of layers of a polymer composition.

In an embodiment, the polymer composition includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The mixture comprises the polyurea and the polyurethane in the predefined ratio of 65:35. The mixture comprises the polyurea, the polyurethane, and the silicon elastomer in the predefined ratio of 65:32:03.

The wooden pallet is selected from a group consisting of plywood, firewood and wood veneer sheets. In one embodiment, the wooden pallet is made of the plywood. In another embodiment, the wooden pallet is made of the firewood.

The mixture of the polyurea and the polyurethane is configured to impart flexural strength and elongation strength to the wooden pallet. The mixture of the polyurea the polyurethane, and the silicon elastomer is configured to impart anti-static property along with flexural strength and elongation strength to the wooden pallet.

In the polymer composition including the polyurea and the polyurethane, reaction occurs between the isocyanate and blend of the polyol and the enamine. The enamine content helps in lowering the moisture sensitivity and the polyol content gives flexural strength. The mixture of polyurethane and polyurea imparts elongation strength to the wooden pallet.

The silicon elastomer is anti-static compound. The polymer composition including the polyurea, the polyurethane and the silicon elastomer provides anti-static property along with high impact and flexural strength to the wooden pallet.

As used herein the term 'polyurea' refers to a type of elastomer that is derived from the reaction product of an isocyanate component and a synthetic resin blend component through step-growth polymerization.

As used herein the term 'polyurethane' refers to a polymer composed of organic units joined by carbamate (urethane) links.

As used herein the term 'silicon elastomer' refers to a durable & highly resistant elastomer (rubber-like material) composed of silicone (polymer) containing silicon together with other molecule like carbon, hydrogen and oxygen. The silicon elastomer's structure always comprises siloxane backbone (silicon-oxygen chain) and an organic moiety bound to the silicon.

In another embodiment of the present invention, a process for coating a polymer composition onto wooden pallet is provided. The process mainly focuses on a matrix coating process for coating the wooden pallet.

FIG. 1 is a flowchart representing steps involved in the process for coating the polymer composition onto wooden pallet, in accordance with an embodiment of the present invention.

The process for coating the polymer composition onto wooden pallet begins with heating a mixture of at least one of polyurea, polyurethane, silicon elastomer, and combination thereof in a predefined ratio at 70° C. to 85° C. to obtain the polymer composition in a molten state at step 102. The mixture comprises one of the polyurea and the polyurethane in the predefined ratio of 60:40 to 80:20, and the polyurea, the polyurethane, and the silicon elastomer in the predefined ratio of 60:37:03 to 78:19:03.

The wooden pallet is selected from a group consisting of plywood, firewood and wood veneer sheets. The mixture comprises the polyurea and the polyurethane in the predefined ratio of 65:35. The mixture comprises the polyurea, the polyurethane, and the silicon elastomer in the predefined ratio of 65:32:03. In such embodiment, the mixture being heated to the temperature ranging between 70° C. to 85° C., to melt the mixture in order to obtain the polymer composition of uniform liquid consistency because the polyurea, the polyurethane, and the silicon elastomer are thermosets. In an exemplary embodiment, the heating of the mixture is carried at 80° C. to obtain a desired viscosity of the mixture for coating the polymer composition onto the wooden pallet.

In an embodiment, the wooden pallet is coated with the molten polymer composition to form a layer of predefined thickness on surface of the wooden pallet at step 104. The coating of molten polymer composition being performed using matrix coating process. The coating of the molten polymer composition on the surface of the wooden pallet is carried using a gun controlled by one of a manual spray method and robotic arm. The coating the layer of predefined thickness of the molten polymer composition on the surface of the wooden pallet is carried at a spray coating chamber. The predefined thickness of the layer of the polymer composition coated on the surface of the wooden pallet ranges from 0.5 mm to 1 mm.

In one embodiment, the predefined thickness of the layer of the polymer composition is uniform over the surface of the wooden pallet. In such embodiment, the layer of the polymer composition is coated uniformly on the surface of the wooden pallet.

In one embodiment, the predefined thickness of the layer of the polymer composition is variable over the surface of the wooden pallet. In such embodiment, the layer of the polymer composition is coated on the surface of the wooden pallet as per requirement.

In one embodiment, spraying the molten polymer composition on the surface of the wooden pallet may include maintaining the temperature of the molten polymer composition between 70° C. to 85° C. In such embodiment, the temperature of the molten polymer composition is maintained between 70° C. to 85° C. in order to maintain viscosity of the molten polymer composition constant for proper coating.

In such an embodiment, the coating on the surface of the wooden pallet is dried at a room temperature at step 106. The coated wooden pallet is dried for a duration of about 30 minutes naturally at room temperature. The layer of predefined thickness formed by the mixture of the polyurea and the polyurethane is configured to impart flexural strength and elongation strength to the wooden pallet. The layer of predefined thickness formed by the mixture of the polyurea, the polyurethane, and the silicon elastomer is configured to impart anti-static property along with flexural strength and elongation strength to the wooden pallet.

The matrix coating process includes forming a matrix of at least four wooden pellets and spray coating in a specific manner. As used herein the term ‘wooden pellet’ refers to a structure of the wood including predefined size and shape. Initially, the spray coating is done on a flat surface of the platform section and is allowed to dry for about 30 minutes, further to which an opposite side of the flat surface is spray coated in the same matrix form of the wooden pallets. In such embodiment, a fixture is fabricated which may be configured to hold at least four wooden pallets. Further, the fixture may be taken to the spray coating chamber via a conveyer. The spray coating chamber may include a side entry and exit sections which may be used for the coating of the at least four wooden pallets. In one embodiment, the chamber may be designed to accommodate four wooden pallets matrix. The coated wooden pallets are dried subsequently. For this purpose, fixture is designed to hold the at least four wooden pallets on the periphery and off centre to allow the coating to get sprayed on maximum area of the sides of the wooden pallet base of each of the at least four wooden pallets. The process includes shifting the fixture holding the at least four wooden pallets which are half coated for drying by the conveyer out of the spray coating chamber.

While the at least four wooden pallets which are half coated are kept for drying, a next set of wooden pallets may be brought in the spray coating chamber for spraying. Likewise, this cycle will repeat for a duration of about 30 minutes with average of 1.5 minutes per wooden pallet. Further, the previously coated at least four wooden pallets may be placed on the fixture with coated surface of the remaining sides of the pallets exposed to further coating. This will give an overlap from the sides to give stronger bonding. Again, the spraying process is repeated on the other side of the wooden pallet and then the set of fully coated wooden pallets is taken for natural drying.

In yet another embodiment of the present invention, a wooden pallet 200 is provided.

Figure 2:
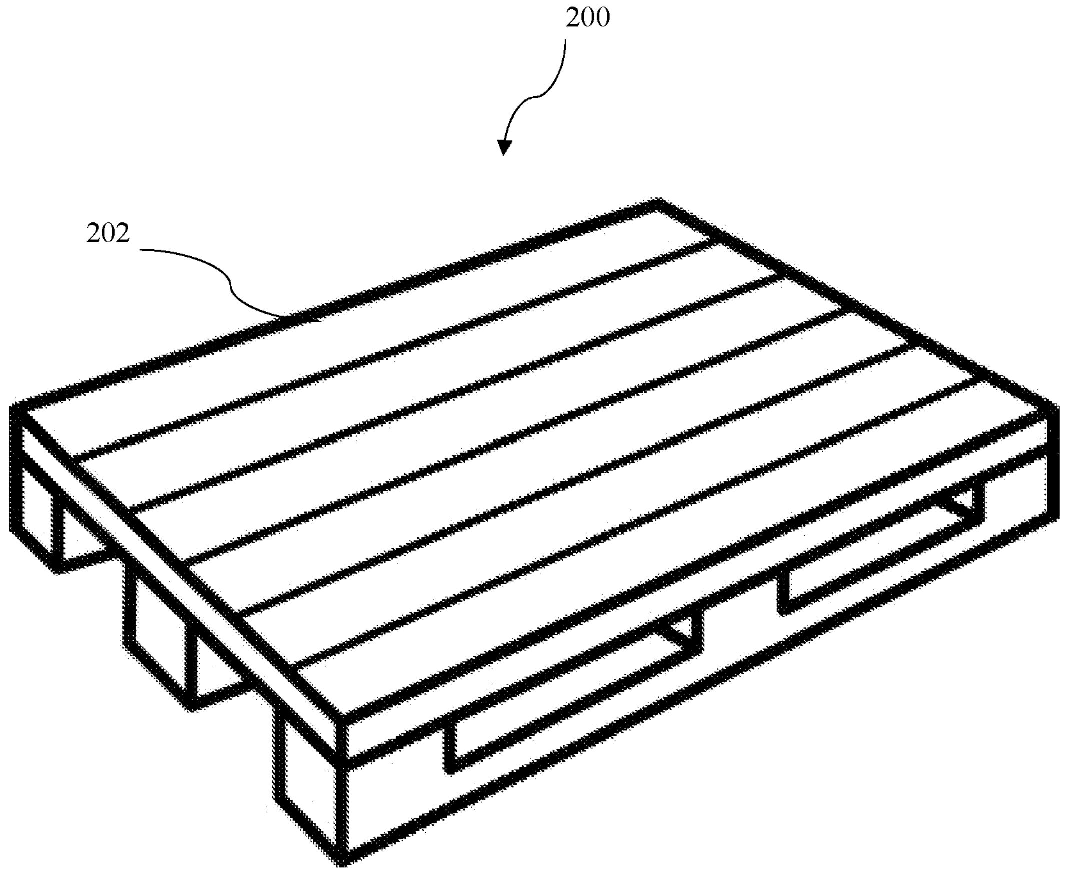
FIG. 2 represents a wooden pallet coated with the polymer composition, in accordance with an embodiment of the present invention.

FIG. 2 represents the wooden pallet 200 coated with the polymer composition, in accordance with an embodiment of the present invention.

The wooden pallet 200 includes a layer 202 of predefined thickness of a polymer composition coated on surface of the wooden pallet 200. The polymer composition includes a mixture of at least one of polyurea, polyurethane, silicon elastomer, and combination thereof in a predefined ratio. The mixture comprises one of the polyurea and the polyurethane in the predefined ratio of 60:40 to 80:20, and the polyurea, the polyurethane, and the silicon elastomer in the predefined ratio of 60:37:03 to 78:19:03. The wooden pallet 200 is selected from a group consisting of plywood, firewood and wood veneer sheets.

The mixture comprises the polyurea, the polyurethane, and the silicon elastomer in the predefined ratio of 65:32:03. The layer 202 of predefined thickness formed by the mixture of the polyurea and the polyurethane is configured to impart flexural strength and elongation strength to the wooden pallet 200. The layer 202 of predefined thickness formed by the mixture of the polyurea, the polyurethane, and the silicon elastomer is configured to impart anti-static property along with flexural strength and elongation strength to the wooden pallet 200. The predefined thickness of the layer 202 of the polymer composition coated on the surface of the wooden pallet 200 ranges from 0.5 mm to 1 mm.

The present invention enables polymer coating of the wooden pallet 200. The polymer composition provided by the present invention impart desired properties such as high impact and abrasion resistance, elongation strength, and anti-static property along with flexural strength to the wooden pallet 200. The use of aliphatic compound in the polymer composition enables to prevent iron stain on the wooden pallet. The present invention also provides the process for coating the polymer composition onto the wooden pallet 200. The process includes the matrix coating process for coating the polymer composition onto the wooden pallet 200 which provides much stronger bonding due to overlap of coating of the polymer composition on the sides of the wooden pallet 200 and reduces the wastage of coating material i.e. the polymer composition. The present invention also provides the wooden pallet 200 coated with the polymer composition. The wooden pallet 200 coated with the polymer composition possesses the properties such as high impact resistance, abrasion resistance, elongation strength, flexural strength, and anti-static property.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A polymer composition for coating a coated wooden pallet, comprising:
a wooden pallet substrate; and
a polymer composition that is coated on a surface of the wooden pallet substrate, wherein the polymer composition comprises:
(i) a first mixture comprising a polyurea and a polyurethane at a first predefined ratio of 60:40 to 80:20; or
(ii) a second mixture comprising the polyurea, the polyurethane, and a silicon elastomer in a second predefined ratio of 60:37:03 to 78:19:03.

2. The coated wooden pallet of claim 1, wherein the wooden pallet substrate is selected from a group consisting of plywood, firewood and wood veneer sheets.

3. The coated wooden pallet of claim 1, wherein the first mixture comprises the polyurea and the polyurethane in the first predefined ratio of 65:35.

4. The coated wooden pallet of claim 1, wherein the second mixture comprises the polyurea, the polyurethane, and the silicon elastomer in the second predefined ratio of 65:32:03.

5. The coated wooden pallet of claim 1, wherein the first mixture of the polyurea and the polyurethane is configured to impart flexural strength and elongation strength to the wooden pallet substrate.

6. The coated wooden pallet of claim 1, wherein the second mixture of the polyurea, the polyurethane, and the silicon elastomer is configured to impart anti-static property along with flexural strength and elongation strength to the wooden pallet substrate.

7. A process for coating a polymer composition onto a wooden pallet, the process comprising:
heating the polymer composition at 70° C. to 85° C. to obtain the polymer composition in a molten state, wherein the polymer composition comprises at least one of:
(i) a first mixture that comprises a polyurea and a polyurethane in a first predefined ratio of 60:40 to 80:20, and
(ii) a second mixture that comprises the polyurea, the polyurethane, and a silicon elastomer in a second predefined ratio of 60:37:03 to 78:19:03;
forming a coating on a surface of the wooden pallet with the molten-polymer composition in the molten state to form a layer of a predefined thickness on the surface of the wooden pallet,
wherein forming the coating of the polymer composition in the molten state is performed using a matrix coating process; and
drying the coating on the surface of the wooden pallet at room temperature;
curing the coating on the surface of the wooden pallet; and
polishing the cured coating on the surface of the wooden pallet.

8. The process of claim 7, wherein the wooden pallet is selected from the group consisting of plywood, firewood and wood veneer sheets.

9. The process of claim 7, wherein the first mixture comprises the polyurea and the polyurethane in the first predefined ratio of 65:35.

10. The process of claim 7, wherein the second mixture comprises the polyurea, the polyurethane, and the silicon elastomer in the second predefined ratio of 65:32:03.

11. The process of claim 7, wherein the layer of the predefined thickness formed by the first mixture of the polyurea and the polyurethane is configured to impart flexural strength and elongation strength to the wooden pallet.

12. The process of claim 7, wherein the layer of the predefined thickness formed by the second mixture of the polyurea, the polyurethane, and the silicon elastomer is configured to impart anti-static property along with flexural strength and elongation strength to the wooden pallet.

13. The process of claim 7, wherein forming the coating of the polymer composition in the molten state on the surface of the wooden pallet is carried out using a gun controlled by one of a manual spray method and robotic arm.

14. The process of claim 7 wherein the layer of the predefined thickness of the polymer composition has a uniform thickness over the surface of the wooden pallet.

15. The process of claim 7, wherein the layer of the predefined thickness of the polymer composition has a variable thickness over the surface of the wooden pallet.

16. The process of claim 7, wherein the layer of the predefined thickness of the polymer composition coated on the surface of the wooden pallet ranges from 0.5 mm to 1 mm.

17. A wooden pallet, comprising:
a layer of a predefined thickness of a polymer composition coated on a surface of the wooden pallet, wherein the polymer composition comprises:
(i) a first mixture comprising a polyurea and a polyurethane at a first predefined ratio of 60:40 to 80:20; and
a second mixture comprising the polyurea, the polyurethane, and a silicon elastomer at a second predefined ratio of 60:37:03 to 78:19:03,
wherein the polymer composition coated on the surface of the wooden pallet comprises a cured and polished coating.

18. The wooden pallet of claim 17, wherein the wooden pallet is selected from a group consisting of plywood, firewood and wood veneer sheets.

19. The wooden pallet of claim 17, wherein the second mixture comprises the polyurea, the polyurethane, and the silicon elastomer in the second predefined ratio of 65:32:03.

20. The wooden pallet of claim 17, wherein the layer of the predefined thickness formed by the first mixture of the polyurea and the polyurethane is configured to impart flexural strength and elongation strength to the wooden pallet.

21. The wooden pallet of claim 17, wherein the layer of the predefined thickness formed by the second mixture of the polyurea, the polyurethane, and the silicon elastomer is configured to impart anti-static property along with flexural strength and elongation strength to the wooden pallet.

22. The wooden pallet of claim 17, wherein the predefined thickness of the layer of the polymer composition coated on the surface of the wooden pallet ranges from 0.5 mm to 1 mm.

* * * * *